May 10, 1966  W. E. SHULTZ  3,249,998
PIPE CUTTER HAVING DISC TYPE CUTTING MEANS AND FLEXIBLE
MEANS TO OPERATE SAID CUTTER
Filed June 11, 1965
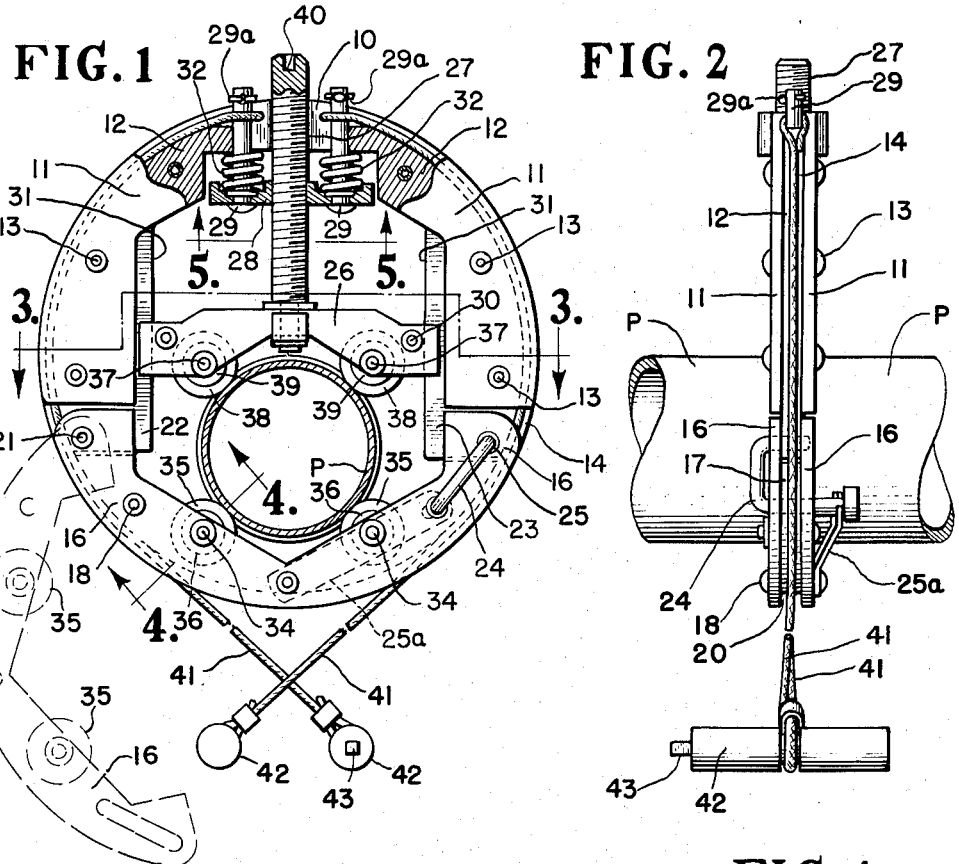
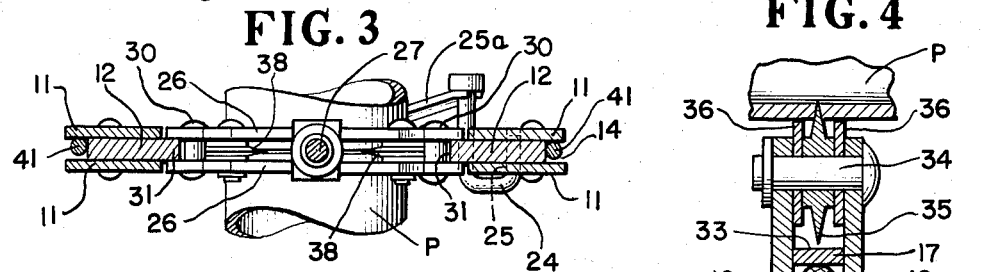
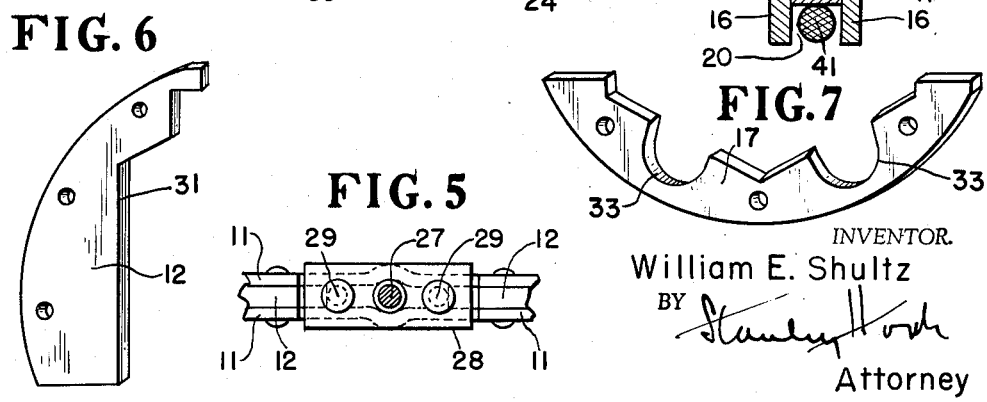
INVENTOR.
William E. Shultz
BY
Attorney

United States Patent Office

3,249,998
Patented May 10, 1966

3,249,998
PIPE CUTTER HAVING DISC TYPE CUTTING
MEANS AND FLEXIBLE MEANS TO OPER-
ATE SAID CUTTER
William E. Shultz, 239 N. Main St., Lombard, Ill.
Filed June 11, 1965, Ser. No. 463,111
7 Claims. (Cl. 30—101)

This invention relates to a pipe cutter and has for its object the provision of a device of this character which enables an operator to perform a cutting operation on pipe installations which are relatively inaccessible, such for example as an exhaust pipe secured to the underframe of an automobile, and which permits the operator to accomplish such an operation with greater convenience as well as accuracy than with formerly known cutters.

It is also an object of this invention to provide a pipe cutter in which the cutters are mounted along the inner periphery of a framework which is applied in full encircling relation to a pipe being cut while the outer periphery of the frame is provided with a grooved rim conforming to a circle having its center parallel to the axis of the pipe being cut and a pair of flexible rope-like cables secured to the outer periphery of the framework has guided sliding fit in said groved rim as said cables are alternately pulled in see-saw fashion while straddling the pipe being cut.

Another object of this invention consists in providing a pipe cutter of inexpensive and simple construction so designed that it may be maintained, adjusted and operated with a minimum amount of effort on the part of the operator.

The foregoing and numerous other important objects, advantages and inherent functions of the invention will be more fully understood from the following description, which, taken in connection with the accompanying drawings, discloses a preferred embodiment of the invention.

Referring to the drawings:

FIG. 1 illustrates an improved pipe cutter embodying the features of the present invention and in which the cutter is shown in operative encircling relation to a pipe to be cut with a dotted line portion to indicate the relative position of parts of the cutter as they appear when the cutter is in process of application to or removal from the pipe being cut.

FIG. 2 is a view showing the cutter as it appears from the right hand side of the same as shown in FIG. 1.

FIG. 3 is a view partly in section and partly in elevation taken along line 3—3 of FIG. 1.

FIG. 4 is a fragmentary section taken along line 4—4 of FIG. 1.

FIG. 5 is a fragmentary section taken along line 5—5 of FIG. 1.

FIG. 6 is a detail view of a spacer member which forms a part of the pipe cutter forming the subject of this invention.

FIG. 7 is a detail view of a second spacer member also forming a part of the present pipe cutter.

For the purpose of illustrating the invention, FIGS. 1, 2 and 3 show the cutter as applied in operative relation to a length of tubular stock such as a pipe, designated generally by the reference character P.

Referring more particularly to the cutter as shown in the drawings, a yoke is defined by a pair of duplicate arm units each having a central portion 10 from which a pair of like arms 11 diverge. Each arm unit is formed of any preferred material but is most conveniently produced as a sheet metal stamping. It is to be noted that the outer edge of each arm unit is continuously convexly curved along the arc of a circle. The arm units and a spacer 12 of approximately double the thickness of the arm units positioned between and secured to the arm units by means of suitable fasteners 13 combine to provide a yoke member of laminated construction. The confronting ends of the spacers 12 are separated so as to define an open area between the central portions 10 of the arm units. It will be noted that the outer edge of the spacers 12 are offset uniformly inwardly from and convexly curved along an arcuate line concentric with the circle defined by the outer edge of the arm units so as to form a recess or groove 14 along the outer periphery or rim of the arm units.

A clamping member of such length as to span the distance between the opposite ends of the arm units of the yoke includes a pair of duplicate stamped metal members having a pair of like diverging arms 16. The outer edges of the arms 16 are likewise curved convexly throughout the length of the clamping member so as to conform with the arc of a circle having a diameter matching the circle with the outer edge of the arm units of the yoke conform. A spacer 17 matching the thickness of the spacer 12 associated with the arm units of the yoke is positioned between and secured to the arms 16 via fasteners 18 to provide a laminated construction. In addition, the spacer 17 presents arcuate outer edge portions in such inwardly offset relation to the corresponding edge portions of the arms 16 of the clamping member as to define a recess 20 between the latter along an arcuate line matching the arc of the circle defining the recess or grooved rim 14 of the yoke. A pivotal connection 21 between a portion 22 of the spacer 12 which is exposed beyond one end portion of one arm 11 of the yoke and an overlapping end portion of the clamping member provides for movement of the clamping member to and from a clamping position relative to the yoke wherein the the opposite end portion of the clamping member is interengaged with an opposite end portion 23 of the spacer 12 extending beyond the end portion of the other arm 11 of the yoke. A latch 24 mounted on the clamping member for movement to and from a latching position relative to an opening 25 in the end portion 23 of the spacer 12 and biased by a spring 25ª toward a latching position, as shown in FIGS. 2 and 3 of the drawing, is operative to normally maintain the clamping member against withdrawal from a clamping position relative to the yoke. Accordingly the yoke and the clamping member in clamping position relative to the yoke provide a framework which totally encircles the pipe P as shown in FIG. 1.

A pair of like stamped metal strips 26 secured in face to face relation astride a threaded shaft 27 by fasteners 30 defines a carrier having a swivel connection with the shaft 27. A nut 28 is suspended from the inner periphery of the central portion 10 of the yoke via a pair of positioning pins 29 fixed to the nut 28 and occupying positions along opposite sides of the open area between central portions 10 of the arm units of the yoke. The opposite end portions of the strips 26 of the carrier have sliding straddling engagement with a guide 31 defined by portions of the spacers 12 of the yoke which project inwardly from the inner periphery of the arms 11 of the yoke and thereby allow the carrier to move under control of the adjustment screw shaft 27 while confined to a fixed line of travel toward and away from the clamping member. A coil spring 32 surrounding each pin 29 acts against inner edges of the central portion 10 of the arms of the yoke and the surface of a seat or depression in the nut 28 opposite thereto to normally urge the nut 28 in a direction toward the clamping member while yieldable under pressure in the opposite direction to allow the nut to move in a direction away from the clamping member. Each pin 29 is grooved to receive a key 29ª which engages outer edges of the central portion 10 of the arms of the yoke to establish the limit of movement of the pins in the direction which said pins are urged by the springs 32. The screw shaft 27 has threaded connection with the nut 28 for axial movement of the shaft along a fixed line of travel centrally of the area straddled by the arms of the yoke whereby the carrier defined by the strips 26 via its swivelled connection with the shaft 27 moves in unison with the shaft to selected positions along said line of travel of the shaft 27.

Notches 33 formed in the spacer 17 of the clamping member provides a clearway between edge portions of the arms 16 which are spaced apart lengthwise of the clamping member at a distance inward from opposite ends of the clamping member. Aligned openings in the arms 16 opposite said clearways each receive a shaft 34 on which a cutter wheel or disk 35 is supported for rotation in a path parallel to the line of travel of the shaft 27. Each disk 35 is of such diameter as to expose a substantial area of the cutting edge of each disk within the open area between the carrier and the clamping member. The distance between the expose edge portions of said cutting disks is established according to the range of diameter sizes of the pipe which it is desired to be acted on by said cutting disks. For the purpose of limiting the depth to entry of the cutting edge through the wall of the pipe undergoing cutting action, each disk is flanked by a pair of washers 36 of selected diameter less than the diameter of the disk associated therewith.

Aligned openings provided in the strips 26 of the carrier each receive a shaft 37 on which a cutter disk 38 duplicating the cutter disks 35 is supported for rotation with the cutting edges thereof in a plane containing the cutting edges of disks 35. It will be noted that the shafts 37 and the shafts 34 occupy positions approximately corresponding to the corners of a rectangle having one pair of opposite sides of such rectangle coincident with a straight line joining the shafts 37 and a straight line joining the shafts 34, and the other opposite sides of such rectangle coincident with a straight line joining shaft 37 with shaft 34 on one side of the line of travel of the threaded shaft 27 and a straight line joining shaft 37 with shaft 34 on the other side of the line of travel of the threaded shaft 27. Washers 39 flanking each cutter disk 38 operate to limit the depth of cutting action of the disks 38 in the same manner as washers 36 function in relation to the disks 35. For the purpose of facilitating dismantling of the cutter disk assembly associated with the shafts 34 and 37, any conventional removable fastening means may be provided.

In preparing the cutter for application to a pipe P the latch 24 is released from latching position so as to free the clamping member and allow the same to be swung away from the yoke member whereupon the tool is adapted to straddle the pipe P. After the yoke member and clamping member are thus applied to the pipe P and the clamping member and the yoke member are in latched position, the adjusting shaft 27 is turned to the extent necessary to cause the pipe to be tightly engaged by the cutter disks 35 and 38. A socket 40 provided in the outer end portion of the shaft 27 is designed to have fitting engagement with a suitable turning tool so as to rotate the adjusting shaft 27 in opposite directions as desired. The cutting disks act to cut the walls of the pipe P in response to rotation of the unit in opposite directions about the pipe P as an axis. Such rotation of the cutter is obtained by alternate pulling force on a pair of flexible rope-like cables 41 fastened to the projecting ends of the pins 29 within the confines of the grooved rim of the yoke as shown in FIG. 1. The grooved rim, it will be noted, received the flexible members 41 with a guided sliding fit whereby the operator is able to apply forces to rock the cutters along a path which coincides with the plane containing the cutting edges of the cutting disks without risk of the members 41 being withdrawn from the grooved rim. A handle 42 is secured to the free end of each cable to facilitate manipulation of the cutter. An axially extending pin 43 projecting from one end of one of the handles 42 provides an implement for reception in the socket in the adjustment shaft and thereby rotate the shaft as needed to control the position of the cutters 38 relative to the cutters 35.

As the tool is thus rotated, the energy stored in the spring 32 as a result of the turned position of the shaft 27, will act on the cutters to gradually deepen the cut into the wall of the pipe P whereupon the adjustment shaft 27 may be operated again to re-energize the springs 32 to urge the cutters more deeply into the material of the pipe P. As the cutters approach a selected depth, the washers 36 associated with the cutters 35 and the washers 39 associated with the cutters 38 will bear against the surfaces of the pipe at opposite sides of the line of cutting produced by the cutters so as to limit the depth of the cutters as well as to prevent distortion of said surfaces. It will be noted that stress applied on the pins 29 incident to pulling force exerted by the flexible members 41 during operation of the cutter is absorbed by edge surfaces of the spacers 12 which face the open area between central portions 10 of the arm units of the yoke.

It is thought that the invention and its numerous attendant advantages will be fully understood from the foregoing description, and it is obvious that numerous changes may be made in the form, construction, and arrangement of the several parts, without departing from the spirit or scope of the invention, or sacrificing any of its attendant advantages, the form disclosed herein being a preferred embodiment for the purpose of illustrating the invention.

The invention is hereby claimed as follows:

1. An improved pipe cutter comprising a pair of interconnected members defining a framework adapted rotatably to surround a pipe to be cut and having a series of rotary cutters mounted thereon in spaced apart relation along the inner periphery of said framework for severing a pipe engaged by said cutters while said pipe is surrounded by said framework and said framework is rocked about said pipe as an axis, a pair of flexible rope-like members having fixed connection to said framework for rocking said framework in response to pulling force applied alternately on said flexible members while said flexible members occupy positions in straddling relation to a pipe engaged by said cutters, and a continuous grooved circular rim defining the outer periphery of said framework in which said flexible members have guided sliding fit while undergoing action to rock said framework.

2. An improved pipe cutter according to claim 1 wherein said flexible members have fixed connection to said framework within the confines of said grooved rim.

3. An improved pipe cutter according to claim 1 wherein adjustment means are provided for establishing the positions of a pair of said cutters at varied distances from a second pair of said cutters, and said adjustment means include a threaded shaft and a nut in which said shaft has axial movement toward and away from the area of the framework occupied by the pipe to be cut along a fixed path extending radially of the axis of said pipe, said nut being connected to said framework for limited movement relative to said framework in unison with said shaft between advanced and retracted positions along said axial line of travel of said shaft, and spring means acting on said nut to bias said nut toward advanced position.

4. An improved pipe cutter according to claim 1 wherein said framework includes a yoke, and a clamping member pivotally connected to one arm of said yoke for swinging movement toward and away from a position in engagement with the other arm of said yoke to establish the framework in surrounding relation to a pipe to be cut when the clamping member is in said position of engagement with the latter arm of said yoke, and latching means are provided for releasably locking said clamping member in said position of engagement with said latter arm of said yoke.

5. An improved pipe cutter including a yoke, a clamping member pivoted to the end of one arm of said yoke for movement relative to said yoke between a clamping position wherein said clamping member in conjunction with the arms of said yoke provide a continuous frame work in encircling relation to a pipe to be cut and a release position wherein said yoke and said clamping member are spread apart for application to and removal from a pipe to be cut, means for releasably securing said clamping member in clamping position, a pair of cutting disks carried by said clamping member for rotation in a path coplanar with and spaced apart lengthwise of a line bridging the distance between the arms of the yoke, a second pair of cutting disks, means supporting said second pair of cutting disks at a fixed distance apart for rotation in a path coplanar with the path of rotation of said first pair of cutting disks and at a distance apart matching the distance between said first pair of cutting disks, said means including a carrier movable along a fixed line of travel relative to the yoke centrally of the area between the arms of the yoke, a threaded shaft, a nut in which said threaded shaft is axially movable to propel said carrier along said fixed line of travel, a pair of flexible rope-like members having fixed connection to said yoke for rocking said cutter about a pipe to be cut as an axis in response to pulling force applied alternately on said flexible members while said flexible members occupy positions in straddling relation to a pipe engaged by said cutting disks, and a continuous grooved circular rim defining the outer periphery of said yoke and said clamping member in which said flexible members have guided sliding fit while undergoing action to rock said cutter.

6. An improved pipe cutter according to claim 5 wherein said flexible members have fixed connection to said yoke within the confines of said grooved rim and in relatively close proximity to a line projected to said rim and coincident with the line of travel of said threaded shaft.

7. An improved pipe cutter according to claim 5 wherein said yoke and said clamping member consist of a spacer flanked by a pair of outer laminations, and said grooved rim is defined by said spacer and edge portions of said outer laminations in outwardly offset relation to the periphery of said spacer.

References Cited by the Examiner

UNITED STATES PATENTS

| | | | |
|---|---|---|---|
| 782,226 | 2/1905 | Ellis | 30—100 |
| 2,639,501 | 5/1953 | Harding | 30—100 |
| 2,716,280 | 8/1955 | Ruhe | 30—100 |
| 2,739,381 | 3/1956 | Petersen | 30—101 |
| 2,983,043 | 5/1961 | Petersen | 30—95 |

WILLIAM FELDMAN, *Primary Examiner.*

MYRON C. KRUSE, *Examiner.*